(12) United States Patent
Ataie

(10) Patent No.: US 12,292,526 B2
(45) Date of Patent: *May 6, 2025

(54) WIRELESS MAPPING IN REAL-TIME USING CORRELATIVE PASSIVE RECEIVER

(71) Applicant: Raytheon Company, Waltham, MA (US)

(72) Inventor: Vahid Ataie, San Diego, CA (US)

(73) Assignee: Raytheon Company, Arlington, VA (US)

( * ) Notice: Subject to any disclaimer, the term of this patent is extended or adjusted under 35 U.S.C. 154(b) by 362 days.

This patent is subject to a terminal disclaimer.

(21) Appl. No.: 17/825,902

(22) Filed: May 26, 2022

(65) Prior Publication Data

US 2022/0381874 A1 Dec. 1, 2022

Related U.S. Application Data

(60) Provisional application No. 63/193,520, filed on May 26, 2021.

(51) Int. Cl.
| | |
|---|---|
| *G01S 5/04* | (2006.01) |
| *G01S 5/02* | (2010.01) |
| *H04W 4/02* | (2018.01) |
| *H04W 4/029* | (2018.01) |

(52) U.S. Cl.
CPC .............. *G01S 5/04* (2013.01); *G01S 5/0294* (2013.01); *H04W 4/023* (2013.01); *H04W 4/029* (2018.02)

(58) Field of Classification Search
CPC .......... G01S 5/04; G01S 5/0294; G01S 11/02; G01S 5/0221; H04W 4/023; H04W 4/029; H04W 4/02; H04B 7/00
See application file for complete search history.

(56) References Cited

U.S. PATENT DOCUMENTS

| | | | |
|---|---|---|---|
| 4,888,593 A | 12/1989 | Friedman et al. | |
| 5,444,451 A | * 8/1995 | Johnson | ............ G01S 3/46 342/453 |
| 5,841,400 A | 11/1998 | Hiramatsu | |
| 5,973,643 A | 10/1999 | Hawkes et al. | |

(Continued)

FOREIGN PATENT DOCUMENTS

| | | |
|---|---|---|
| JP | H10-177064 A | 6/1998 |
| JP | 2001-324556 A | 11/2001 |

(Continued)

OTHER PUBLICATIONS

Notice of Allowance dated Feb. 6, 2024 in connection with U.S. Appl. No. 17/825,899, 8 pages.

(Continued)

*Primary Examiner* — Kabir A Timory

(57) ABSTRACT

Systems and methods for mapping location and characteristics about wireless emitters are described. The systems and methods advantageously use correlative receivers for observing the emissions from the wireless emitters without decrypting or decoding information included in the emissions from the wireless emitters to allow for tracking location and emitter class and type in real-time. The real-time geolocation and emitter class information for many receivers in a geographic area can be determined and overlaid on a map, for example.

20 Claims, 9 Drawing Sheets

(56) References Cited

U.S. PATENT DOCUMENTS

| | | | |
|---|---|---|---|
| 7,268,728 B1* | 9/2007 | Struckman | G01S 5/04 |
| | | | 342/451 |
| 10,685,504 B2 | 6/2020 | Mueck | |
| 11,232,391 B1 | 1/2022 | Baalke et al. | |
| 2004/0012525 A1 | 1/2004 | Yuda et al. | |
| 2006/0109931 A1 | 5/2006 | Asai et al. | |
| 2011/0156957 A1* | 6/2011 | Waite | G01V 3/081 |
| | | | 342/450 |
| 2011/0287778 A1* | 11/2011 | Levin | G01S 5/0294 |
| | | | 342/461 |
| 2014/0022128 A1 | 1/2014 | Smith | |
| 2015/0303989 A1 | 10/2015 | Mathews et al. | |
| 2017/0168485 A1 | 6/2017 | Berntorp et al. | |
| 2018/0079423 A1 | 3/2018 | Weinstein-Raun | |
| 2018/0276986 A1 | 9/2018 | Delp | |
| 2019/0208491 A1 | 7/2019 | Dzierwa et al. | |
| 2022/0232357 A1 | 7/2022 | Zhang et al. | |

FOREIGN PATENT DOCUMENTS

| | | | |
|---|---|---|---|
| JP | 2006-023906 A | | 1/2006 |
| JP | 2006-135674 A | | 5/2006 |
| JP | 2019-175201 A | | 10/2019 |
| JP | 2021-032847 A | | 3/2021 |
| WO | 2020153985 A1 | | 7/2020 |

OTHER PUBLICATIONS

International Search Report and Written Opinion of the International Searching Authority dated Aug. 19, 2022 in connection with International Patent Application No. PCT/US2022/031118, 10 pages.
Notice of Refusal dated Sep. 24, 2024 in connection with Japanese Patent Application No. 2023-572857, 8 pages.
Supplementary European Search Report dated Aug. 29, 2024 in connection with European Patent Application No. 22812153.9, 10 pages.

* cited by examiner

WIRELESS MAPPING IN REAL-TIME USING CORRELATIVE PASSIVE RECEIVER

CROSS-REFERENCE TO RELATED APPLICATIONS

This application claims the benefit of and priority to U.S. Provisional Application No. 63/193,520, filed May 26, 2021, the contents of which are hereby incorporated by reference in their entirety for all purposes. U.S. Provisional Application No. 63/193,519, filed May 26, 2021, is also hereby incorporated by reference.

The following regular U.S. patent applications (including this one) are being filed concurrently, and the entire disclosure of the other application is incorporated by reference into this application for all purposes:

application Ser. No. 17/825,899, filed May 26, 2022, entitled "WIRELESS MAPPING IN REAL-TIME FOR AUTONOMOUS VEHICLES USING CORRELATIVE PASSIVE RECEIVER;" and application Ser. No. 17/825,902, filed May 26, 2022, entitled "WIRELESS MAPPING IN REAL-TIME USING CORRELATIVE PASSIVE RECEIVER."

BACKGROUND

Techniques for wideband spectral correlation function and/or cyclic-autocorrelation function estimation have been developed. Spectral correlation functions and cyclic-autocorrelation functions can be rich in information, providing statistical insights on received signals. There is a need in the art for improved methods and systems related to use of spectral correlation and cyclic-autocorrelation information.

SUMMARY

Aspects described herein relate to the field of mapping and classification of wireless emitters, with particular application of the systems and methods for mapping location and characteristics related to wireless emitters by observing the emissions from the wireless emitters without decrypting or decoding information included in the emissions from the wireless emitters.

According to an aspect, methods of mapping wireless emitters in a geographic area are provided. In one example, a method of this aspect includes generating a pair of signal inputs by receiving wireless emissions from a plurality of wireless emitter at a first pair of antennas; and processing, using a correlative receiver, the pair of signal inputs to determine a set of geolocations of the plurality of wireless emitters. Optionally, the method may further comprise repeating one or more times, generating an additional pair of signal inputs by receiving wireless emissions from the plurality of wireless emitter at an additional pair of antennas; and processing, using the correlative receiver, the pair of signal inputs to determine an additional set of geolocations of the plurality of wireless emitters. For example, one or both antennas of the pair of antennas are the same as or different from one or both antennas of the additional pair of antennas. Optionally, the additional set of geolocations corresponds to more precise geolocations for the plurality of wireless emitters.

In some examples, processing the pair of signal inputs using the correlative receiver can comprise determining a time difference of arrival (TDOA) for wireless emissions received at each antenna of the pair of antennas. As an example, processing the pair of signal inputs using the correlative receiver can comprise determining an angle of arrival (AoA) for wireless emissions received at each antenna of the pair of antennas. In some examples, a method of mapping wireless emitters in a geographic area further includes overlaying the set of geolocations for the plurality of wireless emitters on a geographic or network map data. Optionally, the process of generating the pair of signal inputs by receiving the wireless emissions from the plurality of wireless emitters at a pair of antennas (e.g., where one or both antennas of the pair of antennas are the same as or different from one or both antennas of the additional pair of antennas) and processing, using the correlative receiver, the pair of signal inputs to determine a set of geolocations of the plurality of wireless emitter, can be repeated one or more times over time to allow for tracking geolocations of the plurality of wireless emitters over time.

In some examples, the correlative receiver can use different antennas to receive various wireless emissions, or the same antennas can be used. A group of three or more antennas can be used, for example, in different pair-wise combinations to provide different pairs of antennas to receive the various wireless emissions. In some cases, wireless emissions can be received at three or more antennas, which can be paired in different combinations to provide different pairs of signals for processing by the correlative receiver in order to provide more precise geolocation information, for example.

Correlative receivers can be useful for processing signal inputs to reduce or eliminate interference from noise, such as from natural sources of radio frequency emission. In some examples, processing the pair of signal inputs using the correlative receiver comprises determining a cyclic autocorrelation function or a spectral correlation function of the pair of signal inputs. Optionally, processing the pair of signal inputs using the correlative receiver comprises removing noise using the cyclic autocorrelation function or the spectral correlation function.

Correlative receivers can be useful for determining classes or types of the plurality of wireless emitters by analyzing the pair of signal inputs. For example, emission signatures can be determined and compared with known emission signatures for different classes or types of wireless emitters, and this information can optionally be paired with the geolocation information for the plurality of wireless emitters.

In another example, a method of mapping a plurality of wireless emitters in a geographic area comprises obtaining a set of signal inputs corresponding to wireless emissions from a plurality of wireless emitters received at three or more antennas; processing the set of signal inputs to determine a plurality of cyclic autocorrelation functions or spectral correlation functions for a plurality of pairs of signal inputs of the set of signal inputs using a correlative receiver; and determining a set of geolocations of the plurality of wireless emitters using the cyclic autocorrelation functions or the spectral correlation functions. Optionally, one or more of the antennas are directly coupled to the correlative receiver. Optionally, wherein one or more of the antennas are located remotely from the correlative receiver. Optionally, determining the set of geolocations of the plurality of wireless emitters comprises determining a set of velocities of the plurality of wireless emitters.

Advantageously, methods described herein allow for determining the set of geolocations of the plurality of wireless emitters in real-time or substantially in real-time, such as in a short amount of time (e.g., 10 seconds or less, 5 seconds or less, or 1 second or less) of receipt of the wireless emissions. Further, methods of this aspect can be used for determining geolocations of all detectable emitters in a particular geographic area simultaneously.

Optionally, a method may further comprise overlaying the set of geolocations on a geographic, network, or symbolic map or geographic, network, or symbolic map data. Optionally, methods of this aspect may further comprise transmitting the set of geolocations, or a subset thereof, to a remote server. In this way, geolocations of emitters can be determined and optionally tracked as a function of time.

To determine the set of geolocation of the plurality of wireless emitters, the correlative receiver can process the signal inputs in pair-wise fashion. For example, a first pair of signal inputs corresponding to signals received at two of the antennas can be processed, a second pair of signal inputs corresponding to signals received at two of the antennas can be processed, and a third pair of signal inputs corresponding to signals received at two of the antennas can be processed. Using three antennas $A_1$, $A_2$, and $A_3$, three pairs can be employed: $A_1$ and $A_2$, $A_2$ and $A_3$, and $A_1$ and $A_3$. In some examples, processing the set of signal inputs comprises processing multiple pairs of signal inputs from different pairs of the three or more antennas, using the correlative receiver, to determine a set of time delays associated with receiving the wireless emissions at the three or more antennas; determining a set of angles of arrival of the wireless emissions at the three or more antennas using the set of time delays; and determining the set of geolocations of the plurality of wireless emitters using the set of angles of arrival. By determining at least three sets of angles of arrivals, the locations of each of the wireless emitters can be pinpointed.

In some examples, additional information about each wireless emitter can be derived from the cyclic autocorrelation functions or spectral correlation functions, which can be optionally useful in fingerprinting and/or tracking the wireless emitter over time. In some examples, a method may further comprise analyzing one or more of the cyclic autocorrelation functions or spectral correlation functions to identify a set of classes or types of the plurality of wireless emitters. Optionally, the set of geolocations and the set of classes or types of the plurality of wireless emitters may be overlaid on a geographic, network, or symbolic map or geographic, network, or symbolic map data.

In some examples, various portions of methods may be repeated one or more times. For example, a method may comprise repeating one or more times obtaining a new set of signal inputs corresponding to wireless emissions from the plurality of wireless emitters received at the three or more antennas; processing the new set of signal inputs to determine a plurality of new cyclic autocorrelation functions or spectral correlation functions for a plurality of pairs of signal inputs of the new set of signal inputs using the correlative receiver; and determining a new set of geolocations of the plurality of wireless emitters using the new cyclic autocorrelation functions or the new spectral correlation functions. In this way, methods described herein may track the set of geolocations and one or more new sets of geolocations of the plurality of wireless emitters over time.

In another aspect, systems for mapping a plurality of wireless emitters in a geographic area are described. An example system of this aspect comprises a correlative receiver; and three or more antennas positioned in data communication with the correlative receiver, and one or more processors, such as also in data communication with the correlative receiver. To achieve mapping, the correlative receiver may be configured to process a set of signal inputs corresponding to wireless emissions from a plurality of wireless emitters received at the three or more antennas to determine a plurality of cyclic autocorrelation functions or spectral correlation functions for a plurality of pairs of signal inputs of the set of signal inputs. Further, the one or more processors may be configured to determine a set of geolocations of the plurality of wireless emitters using the cyclic autocorrelation functions or the spectral correlation functions. Optionally, determining the set of geolocations of the plurality of wireless emitters comprises determining a set of velocities of the plurality of wireless emitters.

Optionally, one or more of the antennas are directly coupled to the correlative receiver. Optionally, one or more of the antennas are located remotely from the correlative receiver. Optionally, determining the set of geolocations of the plurality of wireless emitters occurs in real-time or substantially in real-time.

In some examples, the correlative receiver being configured to perform operations may include arranging elements of the correlative receiver in a particular configuration such that various signals are generated and/or processed according to the arrangement of elements. In some examples, the correlative receiver and/or the one or more processors being configured to perform operations may include programming these components with instructions, such as processor executable instructions, which may be optionally stored on one or more non-transitory processor readable storage mediums, that, when executed by a processor cause the processor to perform the operations.

In some examples, the one or more processors are further configured to overlay the set of geolocations on a geographic, network, or symbolic map or geographic, network, or symbolic map data. Optionally, the one or more processors are further configured to transmit the set of geolocations, or a subset thereof, to a remote server.

In some examples, processing the set of signal inputs comprises processing multiple pairs of signal inputs from different pairs of the three or more antennas, using the correlative receiver, to determine a set of time delays associated with receiving the wireless emissions at the three or more antennas; determining a set of angles of arrival of the wireless emissions at the three or more antennas using the set of time delays; and determining the set of geolocations of the plurality of wireless emitters using the set of angles of arrival. In some examples, the one or more processors are further configured to analyze one or more of the cyclic autocorrelation functions or spectral correlation functions to identify a set of classes or types of the plurality of wireless emitters. Optionally, the one or more processors are further configured to overlay the set of geolocations and the set of classes or types of the plurality of wireless emitters on a geographic, network, or symbolic map or geographic, network, or symbolic map data.

In some examples, the correlative receiver is further configured to repeat one or more times obtaining a new set of signal inputs corresponding to wireless emissions from the plurality of wireless emitters received at the three or more antennas; and processing the new set of signal inputs to determine a plurality of new cyclic autocorrelation functions or spectral correlation functions for a plurality of pairs of signal inputs of the new set of signal inputs using the correlative receiver. In some examples, the one or more processors are further configured to repeat one or more times: determining a new set of geolocations of the plurality of wireless emitters using the new cyclic autocorrelation functions or the new spectral correlation functions; and tracking the set of geolocations and one or more new sets of geolocations of the plurality of wireless emitters over time.

Numerous benefits are achieved by way of the present invention over conventional techniques. For example, aspects described provide methods and systems for real-time processing of radiofrequency (RF) input signals that allow passively tracking location and type of transmitter in real-time without requiring the ability to decode the contents of the RF input signals. These and other embodiments of the invention, along with many of its advantages and features, are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description, and any exemplary, preferred, and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION

Figure 1:
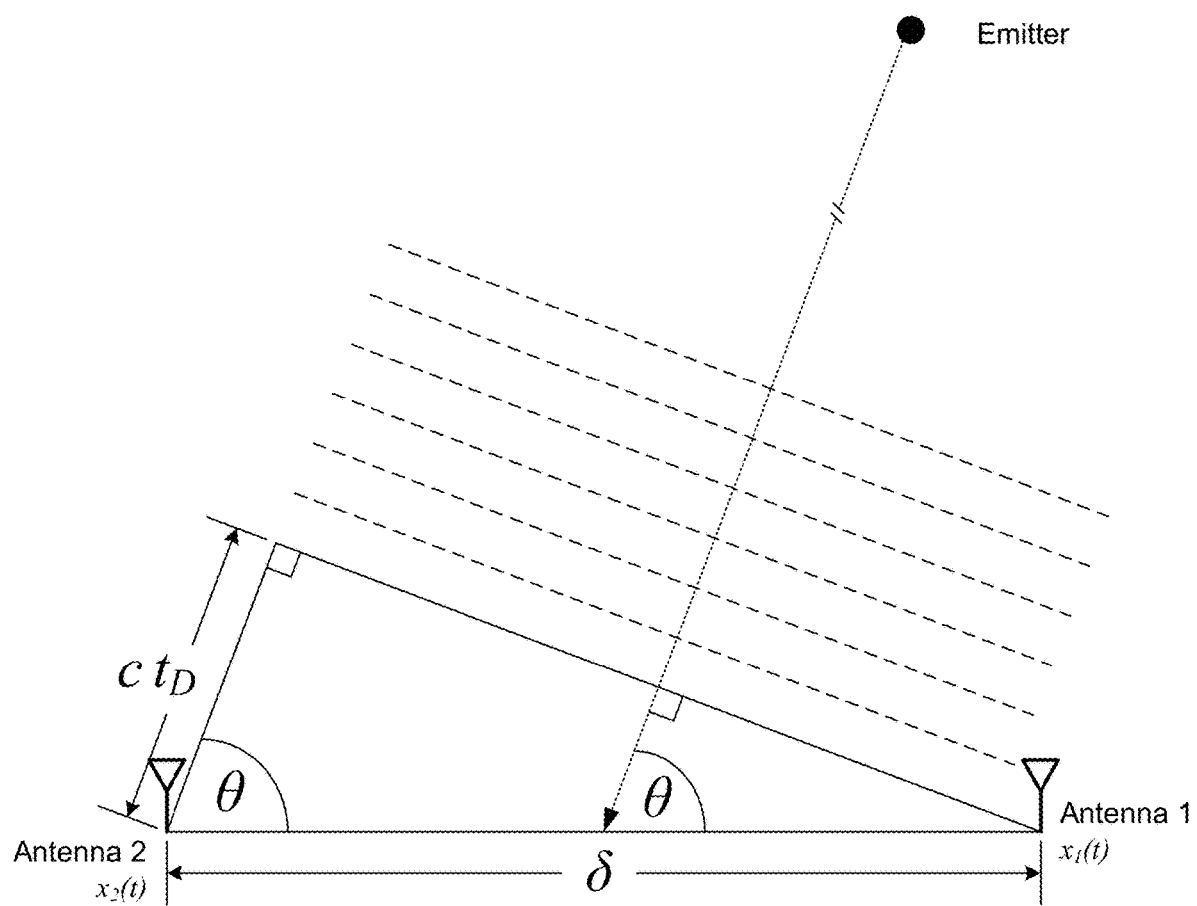
FIG. 1 is a schematic illustration showing receipt of a wireless emission at two different antennas and an angle of arrival of the wireless emission.

The electromagnetic (e.g., radio frequency) emissions made by wireless emitters (e.g., cell phones or other radio frequency devices) are generally broadcast by wireless emitters and received by an appropriate base station (e.g., cell tower). Wireless service providers, like cellular service providers, have the ability to receive, decrypt, and decode transmissions made by wireless emitters operating on their networks. This allows wireless providers to obtain a wealth of information about the signals broadcast by the wireless emitters, including access to the data content in the transmissions. In some cases, wireless emitters are able to self-locate, such as by receiving transmissions from global positioning satellites (GPS), and this information can be provided to wireless service providers as data content in transmissions. Wireless service providers can also use multiple base stations to obtain triangulated location information for the emitters in addition to using GPS location information.

Without access to the signal content of transmissions or the service provider's network, it can be difficult or impractical to determine location information for a large number of emitters in a condensed geographic area. In general, emitter geolocation requires cooperation by the network operator or the emitter and, in absence of these (when collaborative access to multiple networks and emitters is not viable), it is not possible to map all emitters of interest.

However, since wireless emitters broadcast their transmissions as physical electromagnetic emissions, they can generally be detected by any system with a suitable antenna located within an appropriate detection range, provided that receiver has ability to discriminate noise and interference from the emitter signal. This can be achieved without decrypting or decoding the information content, allowing location information about the wireless emitters to be determined, such as based on a received power of the emissions, a frequency of the emissions.

Modern wireless transmissions generally comprise digital modulated signals, where digital data is encoded using one or more modulation techniques, such as using keying techniques like phase-shift keying (PSK), frequency-shift keying (FSK), amplitude-shift keying (ASK), or quadrature amplitude modulation (QAM), or other modulation techniques. These modulated signals may include characteristics that are repetitive in nature, and the underlying data included therein may be encoded or encrypted using various techniques.

In an aspect, real-time correlative receivers, such as for geolocation of wireless communication devices are described. In some examples a real-time correlative receiver comprises signal inputs derived from two spatially separated antennas capable of receiving radio-frequency signals in spectral range greater than 10 MHz; a real-time correlator that operates on two signal inputs in either the time or frequency domain; and a processor that measures or determines one or more of: a time difference of arrival between two signal inputs, an angle of attack of the electromagnetic emission incident on two antenna inputs, and/or a frequency difference of arrival between two signal inputs.

Advantageously, the real-time correlative receivers described herein can reject or isolate artificial emissions by rejecting naturally occurring emission noise or interference. Optionally, a real-time correlative receiver may separate moving and stationary emissions, such as for the purpose of identifying user class or emitter class.

In some examples, correlation is initiated or performed by digitizing an input signal and calculating its Fourier transform in order to compute spectral correlation. In some examples, correlation is realized or performed by varying the delay between two signal inputs, multiplying the two, and performing the temporal integration of the product. Optionally, a delay function is realized or performed using a variable length physical waveguide. Optionally, a delay function is realized or performed using a combination of a tunable oscillator and a dispersive waveguide. Optionally, a multiplication function is realized or performed by an optical or radio-frequency mixer element. Optionally, a multiplication function is realized or performed by a coherent optical detector.

Various outputs of a real-time correlative receiver can be used. In some examples, the output is a spectral correlation function (SCF) or a cyclical autocorrelation function (CAF). Optionally, a real-time correlative receiver can generate SCF and CAF output for the purpose of determining geolocation of the emitter and its velocimetry. Optionally, a real-time correlative receiver can generate SCF and CAF output for the purpose of identifying the type of service the emitter is using. Optionally, a real-time correlative receiver can generate SCF and CAF output for the purpose of identifying the physical parameters of the emitter. Without limitation, example physical parameters may include one or more of: emission frequency and operating band, modulation cycle, coding type used to modulate the emission, spectral and temporal response of the transmitter generating the emission, hardware type comprising the specific emitter, or directivity of the emission.

Real-time correlative receivers can operate over a variety of radio frequencies. In some examples, the operating range is from 10 kHz to 4 GHz. In some examples, the operating range is from 10 kHz to 30 GHz. In some examples, the operating range is from 10 kHz to 110 GHz. Optionally, a real-time correlative receiver operates in an LTE spectral range. Optionally, a real-time correlative receiver operates in a 5G spectral range.

In some examples, a real-time correlative receiver can share its output with a different, spatially distinct real-time correlative receiver. Optionally, two signal inputs are realized by accessing different pairs of spatially separated antennas. In some cases, a real-time correlative receiver comprises or is equipped with more than two antennas. Optionally, a real-time correlative receiver may comprise or have access to a plurality of antennas in a pairwise manner, using the two inputs.

The geolocation data obtained by a real-time correlative receiver can be used in a variety of applications. In an example, emission geolocation data generated by a real-time correlative receiver can be transposed over a geographical map. In an example, emission geolocation data generated by a real-time correlative receiver can be transposed over a network map. In an example, emission geolocation data generated by a real-time correlative receiver can be transposed over a symbolic map, such as a symbolic map used to facilitate exchange of services or used to facilitate communication security. Optionally, emission geolocation data generated by a real-time correlative receiver can be used to provide location-specific services and information.

Correlative receivers can be used to allow location information for wireless emitters to be determined and can allow for determination of emitter characteristics, all based on simply detecting the existence of the wireless emissions and without decoding or decrypting data in the wireless emissions. Since the presence of the wireless emissions can be detected at ranges much greater than needed for decoding or decrypting the data, the signal-to-noise ratio can be much smaller than needed for wireless communications, allowing the useful range for correlative receivers to be considerably larger than for wireless communications. Correlative receivers also allow for improved rejection of noise, such as background or natural radio frequency noise, because the correlative receiver can operate using pair-wise coupling of signals from multiple antenna inputs.

A variety of different correlative receivers can be used, such as a cyclostationary receiver. Such receivers, when used for real-time detection of radio frequency emissions may be limited, however, to the GHz-scale frequency range, or lower, when a conventional (all-electronic implementation) is used. Hybrid correlative receivers, combining analog and digital processing are useful for scaling the useful frequency range to tens of GHz, while still operating in real-time, providing for extension into frequencies with shorter nominal propagation ranges. Additional details about spectral correlation and analysis may be found Correlative Receiver System Time modulated signals, x(t), can be analyzed using spectral correlation, such as to determine characteristics about the signals themselves, without evaluating the data content in the signals. Spectral correlation has been used in signal detection, for example in telecommunications systems. The spectral correlation function of a cyclostationary process describes the cross-spectral density, or coherence, of all pairs of frequency-shifted versions of a time-series. Calculation of the spectral correlation causes the stochastic portion (i.e., noise) of the cyclostationary process to vanish while the deterministic portion having cyclic features emerges.

Cyclostationary and high-order (cumulant) analysis is based on a fact that signals and noise have different correlation (i.e., moment) properties. A modulation-bearing signal, x(t), such as a wireless emission, possesses a unique cyclic autocorrelation, $R_x^\alpha(\tau)$, defined as the Fourier transform of a signal and its delayed copy as shown in equation (1):

$$R_x^\alpha(\tau) = \int_{-\infty}^{\infty} x\left(t - \frac{\tau}{2}\right)x^*\left(t + \frac{\tau}{2}\right)e^{-j2\pi\alpha t}dt. \qquad (1)$$

One of skill in the art will recognize equation (1) as a Wigner function that approximates how the spectral density changes in time. The spectral correlation function, $S_x^\alpha(f)$, is the Fourier counterpart of the cyclic autocorrelation, $R_x^\alpha(\tau)$, as shown in equation (2):

$$S_x^\alpha(f) = \Sigma_{-\infty}^{\infty} R_x^\alpha(\tau) e^{-j2\pi f \tau} dt \qquad (2).$$

Techniques for determining the cyclic autocorrelation function, $R_x^\alpha(\tau)$, and/or spectral correlation function, $S_x^\alpha(f)$, of a modulated signal are described as in U.S. patent application Ser. No. 16/236,038, filed on Dec. 28, 2018, and published under publication no. US 2019/0339548 on Nov. 7, 2019, now U.S. Pat. No. 11,137,627, which is hereby incorporated by reference. It will be appreciated that if one of a cyclic autocorrelation function $R_x^\alpha(\tau)$ or a spectral correlation function, $S_x^\alpha(f)$, is available or determined, the other can be obtained directly as they are related to one another by Fourier transform, as described above.

Obtaining a cyclic autocorrelation function and/or spectral correlation function of wireless emissions can allow for determination of characteristics information about the emission, such as a carrier frequency, bandwidth, bit rate, modulation type. For use in determining geolocation information about an emitter, multiple spatially separated antennas can be used in a variation of cyclic autocorrelation, referred to herein as cyclic cross-correlation. When two antennas are separated from one another by a distance, they can both receive the same wireless emission, but there will be a time delay, $t_D$, between the received signals, which will be a function of the distance between the antennas. Instead of determining the correlation of a received signal x(t) with itself (autocorrelation), the signals received at two different antennas ($x_1(t)$ and $x_2(t)$) can be correlated with one another:

$$R_{x_1 x_2}^{\alpha}(\tau) = \int_{-\infty}^{\infty} x_1\left(t - \frac{\tau}{2}\right) x_2^*\left(t + \frac{\tau}{2}\right) e^{-j2\pi\alpha t} dt. \quad (3)$$

Values of $\tau$ for cyclic cross-correlation will be shifted by the time delay, $t_D$, between receiving the signals at the different antennas. Maxima-finding algorithms can quickly estimate $t_D$ and the angle of arrival (AoA) for the signals with respect to a line between the antennas. FIG. 1 shows an overview of the geometry of two antennas with respect to an emitter, showing the distance between them $\delta$ and the angle of arrival, $\theta$, where a cosine function defines the relationship between $\theta$, $\delta$, and $t_D$:

$$\cos\theta = \frac{ct_D}{\delta}. \quad (4)$$

Figure 2:
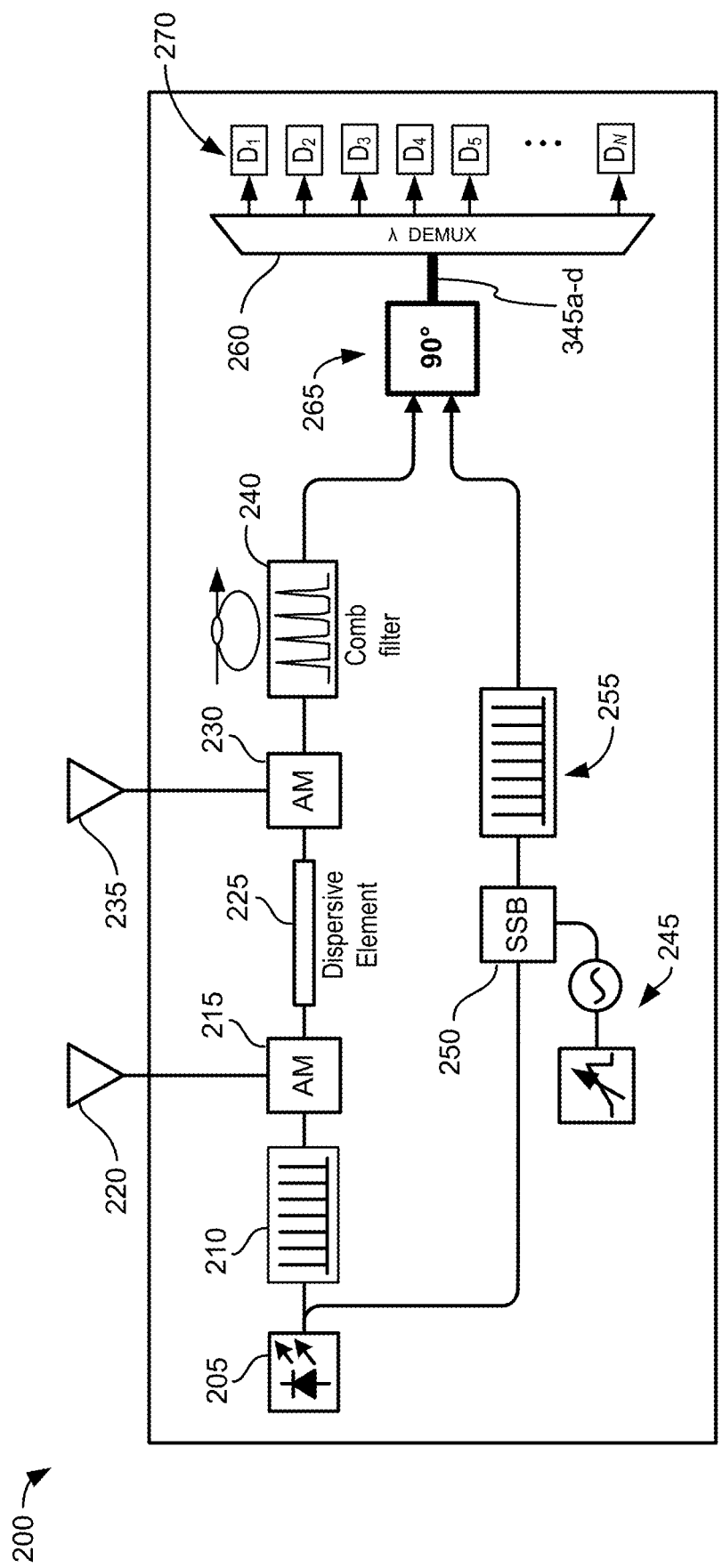
FIG. 2 provides a schematic illustration of an example correlative receiver system in accordance with some examples of the present disclosure.

FIG. 2 is a block diagram of a correlation system 200, useful for determining cyclic autocorrelations, cyclic cross-correlations, and/or spectral correlation functions. The correlation system 200 may provide means to solve the Wigner equation (i.e., equation (1)) and variations thereof in the optical domain without performing the repetitive calculations typically required to obtain a solution. Referring to FIG. 2, the correlation system 200 may include a master laser 205, a first optical modulator 215, a dispersive element 225, a second optical modulator 230, and an optical comb filter 240. The master laser 205 may be, for example, but not limited to, a low-linewidth semiconductor laser or other laser. The master laser 205 may generate a self-referenced optical frequency comb signal 210 of signals at different optical wavelengths (i.e., colors, or tones). The tones of the optical frequency comb signal 210 may be modulated at the first optical modulator 215 by a first input signal $x_1(t)$ corresponding to a radio frequency (RF) signal received at first antenna 220. The first optical modulator 215 may generate N spectral copies of the first input signal $x_1(t)$ on the tones of the optical frequency comb signal 210.

The N spectral copies of the first input signal $x_1(t)$ may be sent to the dispersive element 225. The dispersive element 225 may be an optical fiber dispersive element, for example, but not limited to, a single mode fiber or other dispersive element. The dispersive element 225 may generate wavelength-dependent time delays, $\tau_k$, between adjacent spectral copies of the first input signal $x_1(t)$. The time delays correspond to phase shifts in the frequency domain. The delayed spectral copies (i.e., $x_1(t-\tau_1) \ldots x_1(t-\tau_N)$) of the first input signal $x_1(t)$ may be sent to the second optical modulator 230.

The second optical modulator 230 may modulate the delayed spectral copies of the first input signal $x_1(t)$ with a conjugate $x_2^*(t)$ of a second input signal $x_2(t)$ corresponding to a radio frequency (RF) signal received at second antenna 235, which may comprise a time-delayed version of the first input signal $x_1(t)$. The second optical modulator 230 may generate conjugate modulated spectral copies (i.e., $x_2^*(t)x_1(t-\tau_1) \ldots x_2^*(t)x_1(t-\tau_N)$) of the delayed spectral copies. The conjugate modulation of the delayed spectral copies of the input signal $x_1(t)$ results in the practical generation of the terms $$x_1\left(t - \frac{\tau}{2}\right) x_2^*\left(t + \frac{\tau}{2}\right)$$

from equation (3) that are integrated to obtain the cyclic autocorrelation or cross-correlation coefficients.

The conjugate modulated spectral copies may be sent to the optical comb filter 240. The optical comb filter 240 may be, for example, but not limited to, a fine resolution etalon or other optical comb filter. The optical comb filter 240 may perform the integration of the conjugate modulated spectral copies to produce integrated conjugate modulated spectral copies corresponding to the cyclic autocorrelation coefficients for all time delays $\tau_k$. For example, the N-th integrated conjugate modulated spectral copy may have a complete set of cyclic autocorrelation coefficients $R_{x_1 x_2}^{\alpha_i}(\tau_N)$ corresponding to $\tau_N$ delay at each cyclic frequency $\alpha_i$, where i=1, 2, . . . N. Consequently, a full complement of N integrated spectral copies will form a complete cyclic autocorrelation table, eliminating a need for full-rate FFT computations in either photonic or electronic domains.

Correlation system 200 illustrated in FIG. 2 further includes components for readout of the cyclic autocorrelation coefficients. For example, correlation system 200 may include a radio frequency (RF) oscillator 245, a third optical modulator 250, for example, a single side band (SSB) modulator or other modulator, an optical wavelength demultiplexer 260, a 90° hybrid optical module 265, and a plurality of detectors $D_1$-$D_N$ 270. The plurality of detectors $D_1$-$D_N$ 270 may be coherent receivers. The RF oscillator 245 may generate a swept frequency. The signal generated by the master laser 205 and the swept frequency generated by the RF oscillator 245 may be input to the third optical modulator 250.

The third optical modulator 250 may shift the signal generated by the master laser 205 in frequency, for example, by several gigahertz or another amount, this frequency shifted signal may be used to generate the second optical frequency comb 255. The second optical frequency comb 255 may have the same frequency pitch as the original frequency comb 210 used to spectrally clone the input signal $x_1(t)$; however, the comb teeth of the second optical frequency comb 255 may be sweeping by several gigahertz following the swept RF oscillation 245. The generated frequency comb may be referred to herein as swept optical sampling signals. The swept optical sampling signals may sweep at a lower rate than the frequency of the master laser signal, for example, a frequency of approximately 25 kHz or another frequency.

The swept optical sampling signals and the integrated conjugate modulated spectral copies may be combined by the 90° hybrid optical module 265. The 90° hybrid optical module 265 may act as a coherent receiver and output four signals: a modulated signal plus local oscillator signal, a modulated signal minus local oscillator signal, a modulated signal plus conjugate of local oscillator signal, and a modulated signal minus conjugate of local oscillator signal. The output signals of the hybrid optical module 265 may be input to the optical wavelength demultiplexer 260.

The optical wavelength demultiplexer 260 may include a plurality of demultiplexer modules. In some implementations, four demultiplexer modules may be used. Each demultiplexer module may be configured to demultiplex one output of the hybrid optical module 265. The demultiplexed signals may be detected by the plurality of detectors 270. The plurality of detectors $D_1$-$D_N$ 270 may be coherent detectors. In some embodiments, each coherent detector may include two balanced detectors, with each balanced detector having two PIN diodes (i.e., a total of four PIN diodes for each coherent detector). Each of the plurality of detectors $D_1$-$D_N$ 270 receives a signal from each of the plurality of demultiplexer modules. For example, for implementations using four demultiplexer modules, each detector $D_1$-$D_N$ receives a signal from each demultiplexer module, i.e., each detector $D_1$-$D_N$ receives four signals.

Each of the detectors $D_1$-$D_N$ may coherently detect cyclic autocorrelation (cross-correlation) coefficients for all time delays $\tau_k$ of an associated tone from the integrated conjugate modulated spectral copies. The detectors $D_1$-$D_N$ may simultaneously stream the coefficients such that the $R_{x_1x_2}^{\alpha_1}(\tau_1)$, $R_{x_1x_2}^{\alpha_1}(\tau_2)$, ... $R_{x_1x_2}^{\alpha_1}(\tau T_N)$ coefficients are detected at the same time, the $R_{x_1x_2}^{\alpha_2}(\tau_1)$, $R_{x_1x_2}^{\alpha_2}(\tau_2)$, ... $R_{x_1x_2}^{\alpha_2}(\tau_N)$ are streamed simultaneously after the $R_{x_1x_2}^{\alpha_1}(\tau_1)$, $R_{x_1x_2}^{\alpha_1}(\tau_2)$, ... $R_{x_1x_2}^{\alpha_1}(\tau_N)$ coefficients, etc. The detectors $D_1$-$D_N$ may output the detected cyclic autocorrelation coefficients as a function of time. Thus, correlation system 200 can provide for efficiently determining the cyclic autocorrelation or cross-correlation coefficients. The detected coefficients may be digitized, for example using an analog-to digital (A/D) converter, and the spectral correlation function calculated.

Correlation system 200 can include other components beyond those illustrated in FIG. 2, such as processors, input or output devices, control devices, memory devices, storage devices, or the like. It will be appreciated that correlation system 200 merely provides one example of a correlative receiver and that other implementations may be used instead. For example, certain aspects of correlation system 200 can be implemented using digital system components. For example, all-electronic implementations of correlative receivers can be used, as well as hybrid correlative receivers that combine analog and digital signal processing cores. In some examples, when analog signals from the antennas are measured as a function of time, these analog signals can be quantized using one or more analog to digital converters. To obtain the frequency spectrum of the signal received at the antenna, a fast Fourier transform (FFT) can be performed on the digital data.

Figure 3:
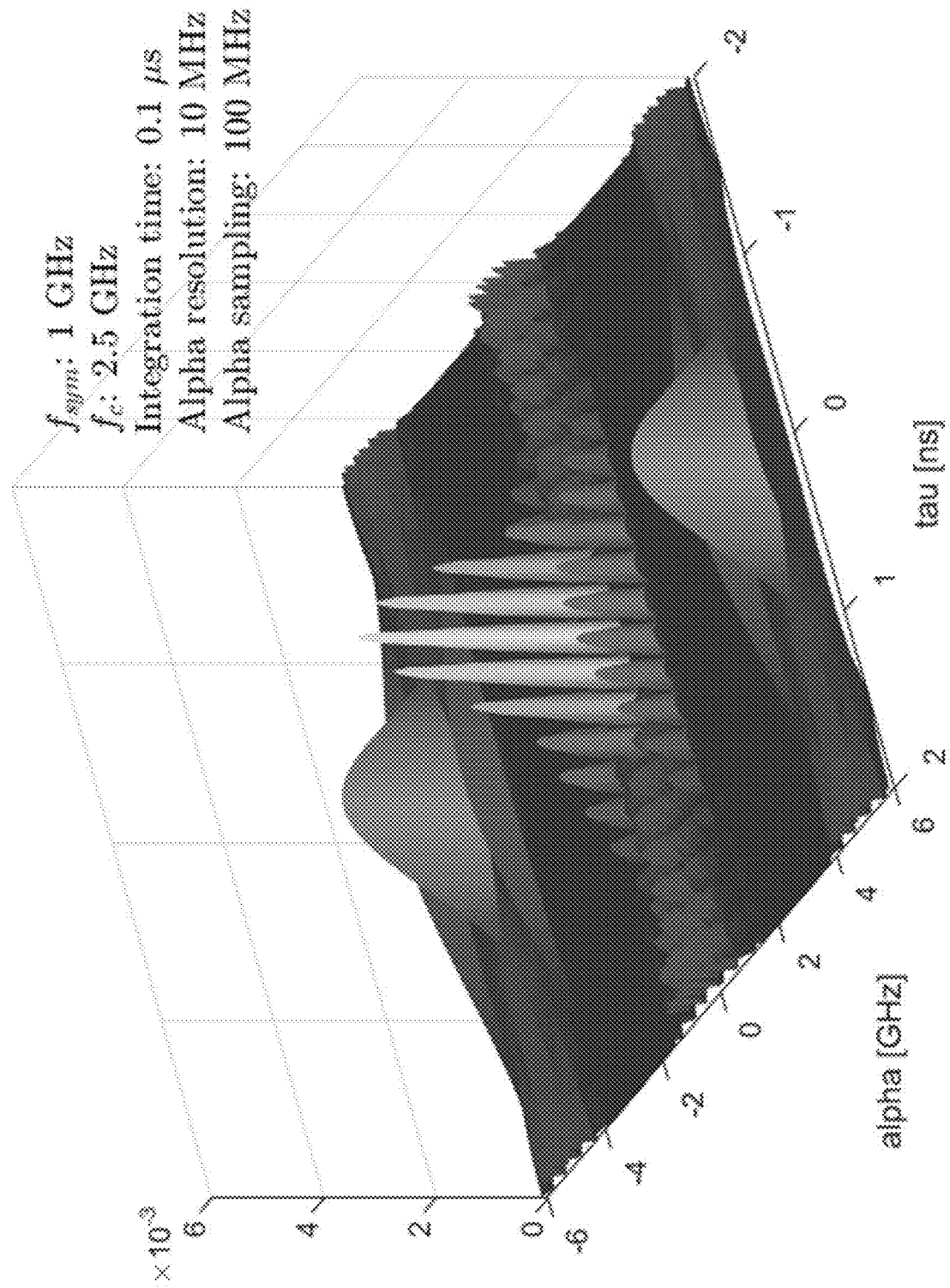
FIG. 3 provides a 3-dimensional plot illustrating an example cyclic autocorrelation function.
Figure 4:
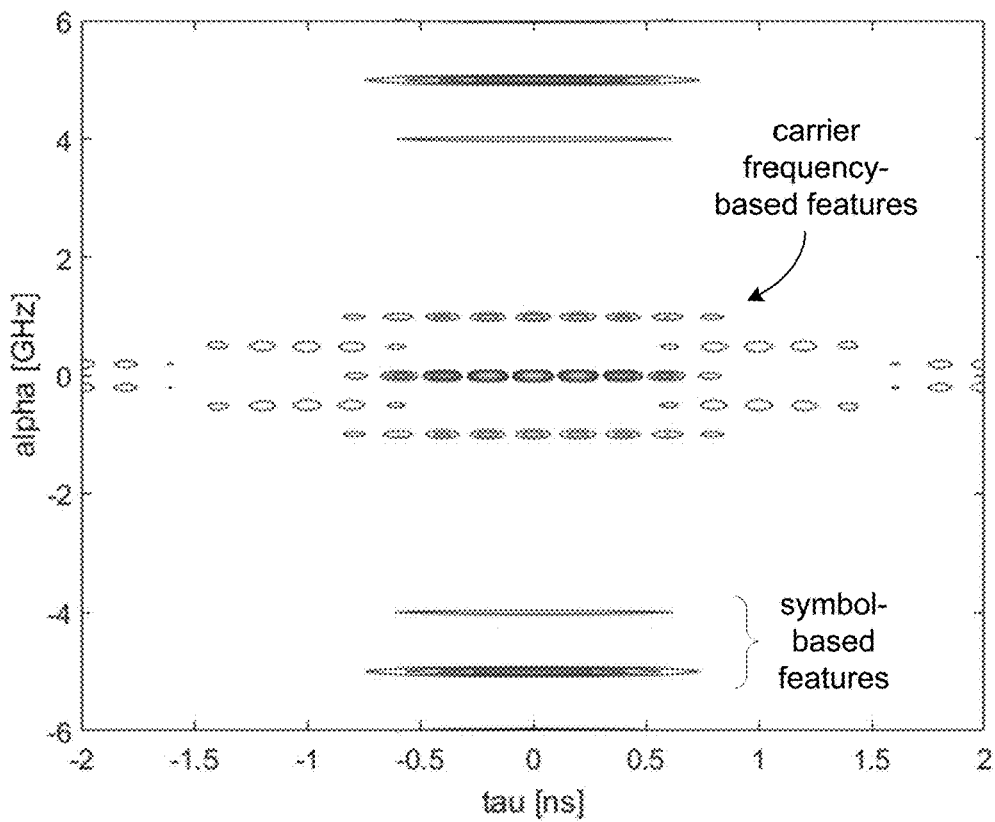
FIG. 4 provides a 2-dimensional plot illustrating an example cyclic autocorrelation function.
Figure 5:
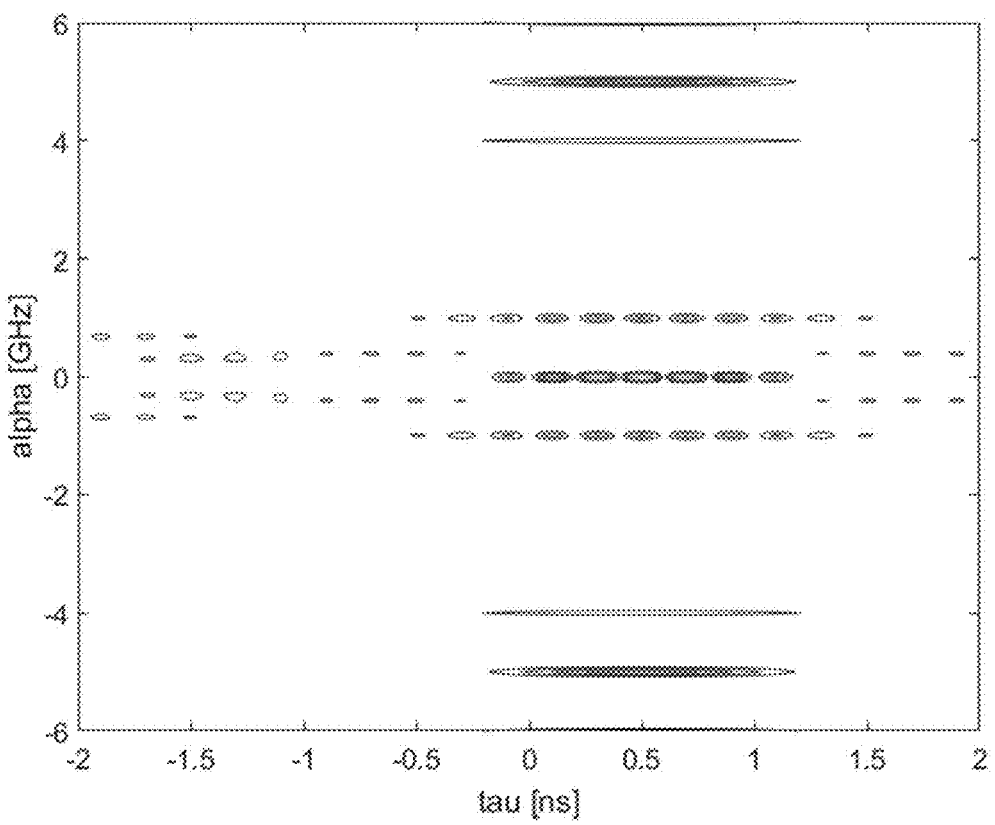
FIG. 5 provides a 2-dimensional plot illustrating another example cyclic autocorrelation function for a time-delayed signal.

FIG. 3, FIG. 4, and FIG. 5 shows cyclic autocorrelation function plots for a 1 GHz symbol rate BPSK signal with a root-raised cosine filter, for antennas spaced 1 m apart, showing both symbol-based features and carrier frequency-based features. In FIG. 3, the plot shows the data as a 3-dimensional plot and the FIG. 4 shows the same data as a 2-dimensional plot. In FIG. 5, symbol-based features are centered around $\tau=0$ ns, indicating that a delay time, $t_D$, between the signals received at the two antennas is about 0 ns. In FIG. 5, the symbol-based features are shifted to the right, and centered around $\tau=0.5$ ns, indicating that the delay time, $t_D$, between the signals received at the two antennas is about 0.5 ns. Based on this information and using equation 4, above, the angle of arrival for the signals shown in FIG. 4 is 90°, and the angle of arrival for the signals shown in FIG. 5 is 81°.

Figure 6:
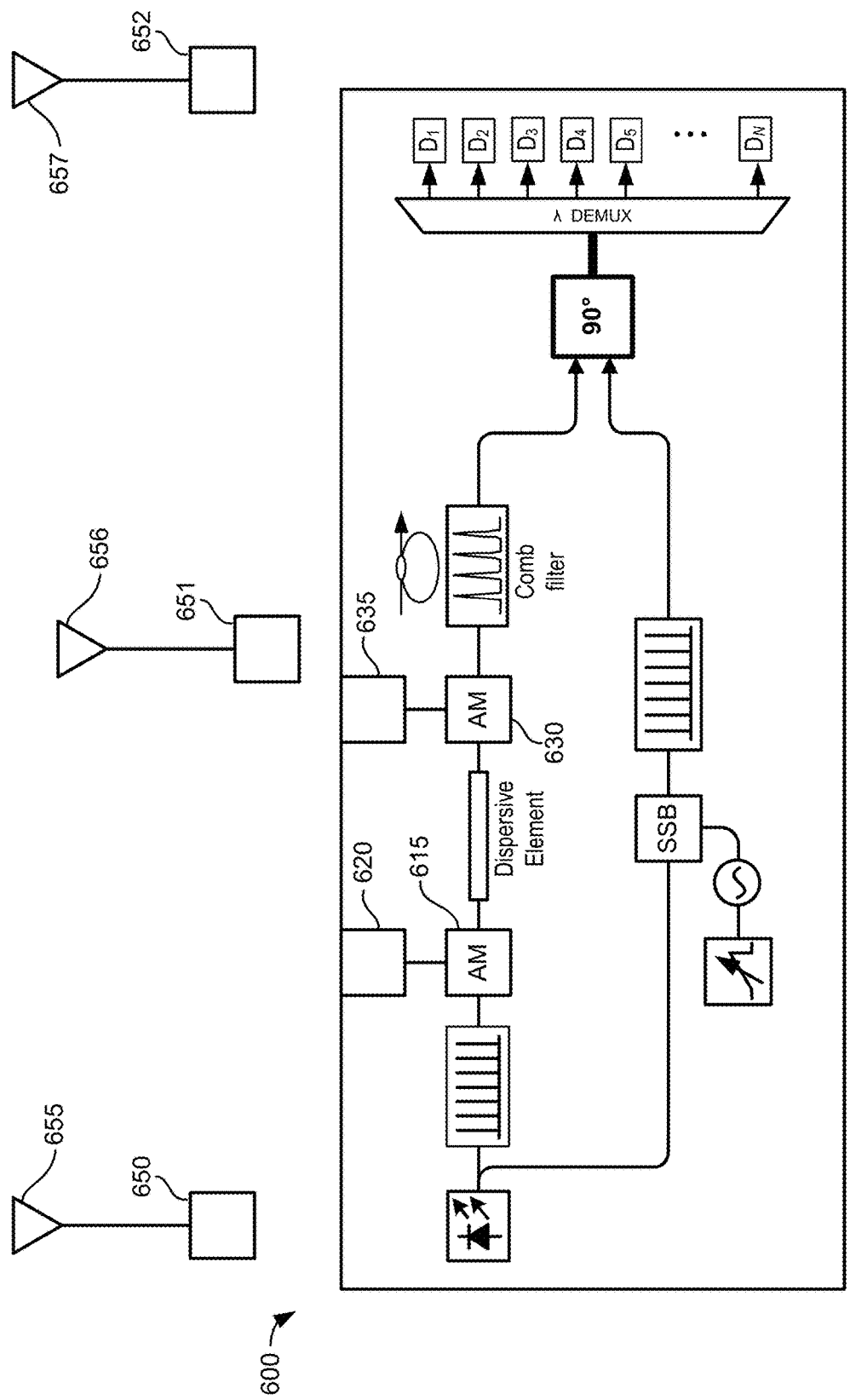
FIG. 6 provides a schematic illustration of an example correlative receiver system in accordance with some examples of the present disclosure.

In some examples, determining a cyclic autocorrelation or spectral correlation function can be achieved using antennas that are remote from a correlation system, in contrast with the configuration in correlation system 200, shown in FIG. 2. For example, FIG. 6 shows a correlation system 600, similar to correlation system 200, which contains other components to enable use of remote antennas. For example, instead of antennas being directly coupled to first optical modulator and second optical modulator, correlation system 600 includes a first input subsystem 620 coupled to first optical modulator 615 and a second input subsystem 635 coupled to second optical modulator 630. Although illustrated as separate subsystems in FIG. 6, input subsystems 620 and 635 can be the same component. Correlation system 600 can include other components beyond those illustrated, such as processors, input or output devices, control devices, memory devices, storage devices, or the like.

Input subsystems 620 and 635 can provide remote modulating signals $x_r(t)$ in place of the modulating signals provided by antennas 220 and 230 in correlation system 200. Here, the remote modulating signals $x_r(t)$ can correspond to antenna signals received at correlation system 600 from a remote antenna system. For example, FIG. 6 shows three remote antenna systems 650, 651, and 652, each respectively including its own antenna, 655, 656, and 657. Remote antenna systems 650, 651, and 652 can include components to obtain, digitize, and transmit received signals at the corresponding antennas as digital data to correlation system 600, where first and second input subsystems 620 and 635 can respectively use the digital data to generate and provide the modulating signals $x_r(t)$ to first and second optical modulators 615 and 630. For example, remote antenna systems 650, 651, and 652 can include amplifiers, analog-to-digital converters, and other components to receive, digitize, and/or process emission signals received at the corresponding antennas and communicate (e.g., over wireless or wireline digital communications) the received signals as digital data to correlation system 600. In some examples, a remote antenna system can include a processor or other component to transform the received and digitized emission signals, such as to determine a Fourier transform of the emission signals and/or to determine a conjugate of an emission signal or a Fourier transform, and/or to compress or encode the digital data. Although three remote antenna systems 650, 651, and 652 are shown in FIG. 6, any desirable number of additional antenna systems can be used. Further, one or more antennas may be directly integrated in correlation system 600, but use of multiple remote antennas may provide various advantages.

For example, by using remote antenna systems, correlation system 600 can obtain cyclic autocorrelation or spectral correlation functions in pairwise manners between any or all pairs of antennas, as desired. In the configuration illustrated in FIG. 6, for example, input subsystem 620 can use the antenna signal from remote antenna system 650 and input subsystem 635 can use the antenna signal from remote antenna system 651. Additionally or alternatively, input subsystem 620 can use the antenna signal from remote antenna system 651 and input subsystem 635 can use the antenna signal from remote antenna system 652. Additionally or alternatively, input subsystem 620 can use the antenna signal from remote antenna system 652 and input subsystem 635 can use the antenna signal from remote antenna system 650. The converse pairs of antenna assignments may also be used. In this way, three pairs of antennas may be used, each to determine an angle of arrival of a received emissions, and using the angles of arrival a precise location of an emitter can be determined.

Tracking Emitters Locations

Figure 7:
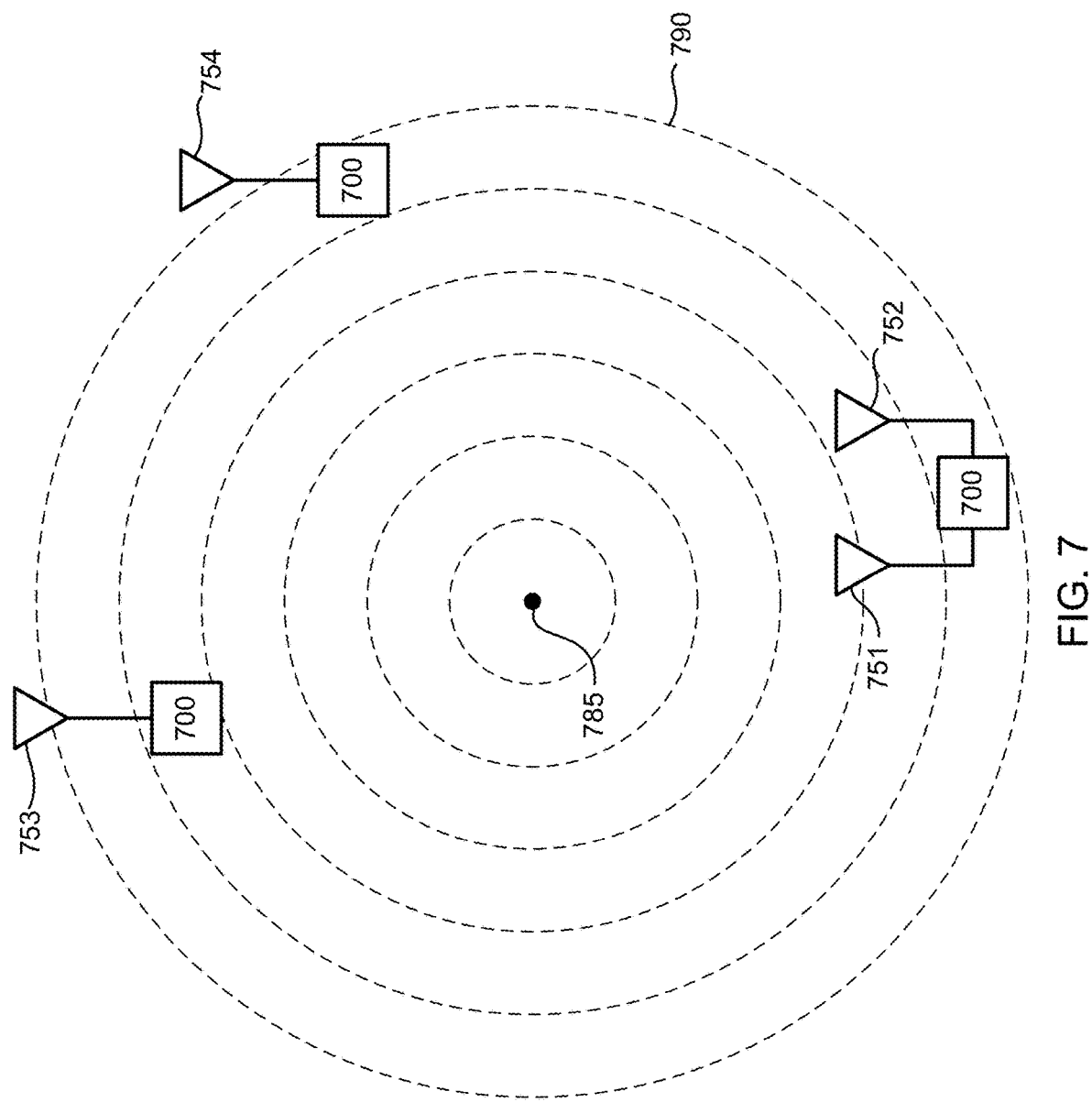
FIG. 7 provides a schematic illustration of distribution of a plurality of antenna systems and/or correlative receiver systems across a geographic area.

FIG. 7 provides a schematic illustration of plurality of antenna systems 700 positioned around a geographic area containing an emitter 785 generating radio frequency emissions 790. The geographic area can be a city, town, or any desirable subset thereof. In some examples, the geographic area can be a cell, or portion thereof, in a cellular network, such as a macrocell area, microcell area, etc.

In this example, antenna systems 700 may comprise a remote antenna system or a correlation system, such that antennas 751, 752, 753, and 754 may be used in any pairwise combination to determine angles of arrival to emitter 785 by determining cyclic autocorrelation functions and/or spectral correlation functions and time delays, $t_D$, for the emissions

790. Using the angles of arrival, the geolocation (e.g., relative geographic coordinates from the antennas) can be determined for the emitter 785. If the absolute geographic coordinates of one or more of the antennas is known, the geolocation can be the absolute geographic coordinates (e.g., x and y, or latitude and longitude, etc.) for the emitter.

When multiple emitters 785 are present in the geographic area, geolocations for each emitter can be similarly obtained in the same way and using the same pairs of antennas, provided that the antennas are capable of receiving the emissions. In some cases, narrow-band antennas can be used to sensitively monitor a subset of the radio frequency spectrum, but mixed-signal receivers can also cover very large bands of the radio frequency spectrum, allowing for determining geolocations for large numbers and varieties of emitters. Advantageously, obtaining a cyclic autocorrelation function and/or spectral correlation function using pair-wise antennas as described herein can be used to obtain geolocation for all emitters 785 simultaneously.

It will be appreciated that the antenna systems 700 can be located at extremely long distances from the emitters 785 and still be useful for determining geolocation and other information. For example, the signal to noise ratio needed to determine the geolocation of the emitters 785 according to the techniques described herein can be significantly smaller than the signal to noise ratio needed to receive and decode the data transmissions made by the emitters 785. It is possible to use correlative receivers to determine a location and classification of wireless emitters at distances well outside the typical operational range needed for wireless communication. This can be the case since the data in the electromagnetic emission does not need to be recovered by the correlative receiver, effectively reducing the required signal-to-noise ratio, allowing a correlative receiver to be positioned much further away than is needed for a typical base station, which generally establishes a two-way link with wireless emitters and, as a result, is often positioned in reasonable proximity to the wireless emitters. In this way, a single or small set of correlative receivers can be positioned in a geographic area or at the edge of a geographic area and still be useful for tracking location and characteristics of emitters across the geographic area. Further, the correlative receivers useful in the systems and methods described herein can provide for high discrimination against noise. For example, cyclic autocorrelation functions and/or spectral correlation functions are able to restrict noise to certain positions because a signal is correlated with itself. In a spectral correlation function, the noise is confined to a specific correlation frequency or cyclic frequency ($\alpha=0$), while modulated signals are able to rise above the detection floor elsewhere and provide a modulation signature. In a cyclic autocorrelation function, the noise is confined to the origin of the specific correlation frequency or cyclic frequency ($\alpha$) and time delay ($\tau$) map.

Figure 8:
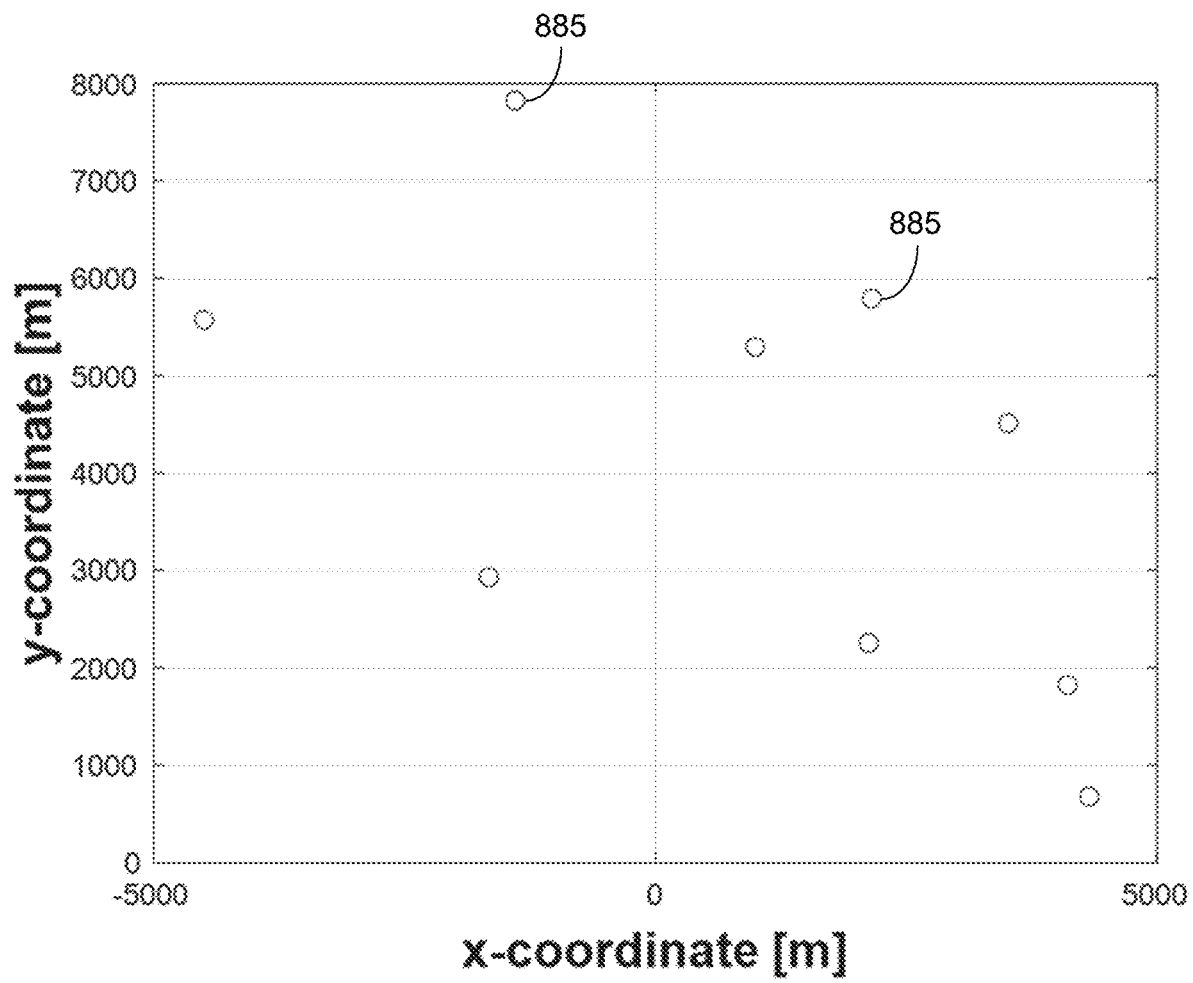
FIG. 8 provides an example plot showing geolocations of detected wireless emitters.

With geolocation information available for a plurality of emitters, such information can be overlaid on a map or other coordinate system to show the distribution of emitter locations. FIG. 8 provides an example coordinate system showing x- and y-coordinates of a variety of different emitters 885 in a 8 km by 10 km geographic area as determined by a correlation system described herein using at least three antennas in pairwise fashion, as described above.

Additional information about each emitter can be determined by further examining the cyclic autocorrelation functions and/or spectral correlation functions obtained for determining the geolocations of emitters 885. For example, the positions and numbers of features in a cyclic autocorrelation function and/or spectral correlation function can provide a physical signature indicating details regarding the emitter, as different types of wireless emitters will emit with different physical characteristics, such as emission frequency and operating band, modulation cycle, coding type used to modulate the emission, spectral and temporal response of the transmitter generating the emission, etc., and this may also vary based on the wireless service being used, based on the hardware type comprising the specific emitter, or based on the wireless service provider's configuration. For example, using known wireless emitter capabilities, specific information about an individual wireless emitter can be determined by detecting the physical electromagnetic emissions, again without decoding or decrypting the content. This can be achieved by analyzing amplitudes or phases of features in a cyclic autocorrelation function and/or spectral correlation function, and/or using a pattern matching function for known signatures. Additional details regarding techniques for analyzing signals using correlative receivers are described in U.S. patent application Ser. No. 17/681,629, which is hereby incorporated by reference in its entirety. In some cases, a database of known emitter types can be used to match physical signature information with the type, class, manufacturer, and or model of an emitter.

Figure 9:
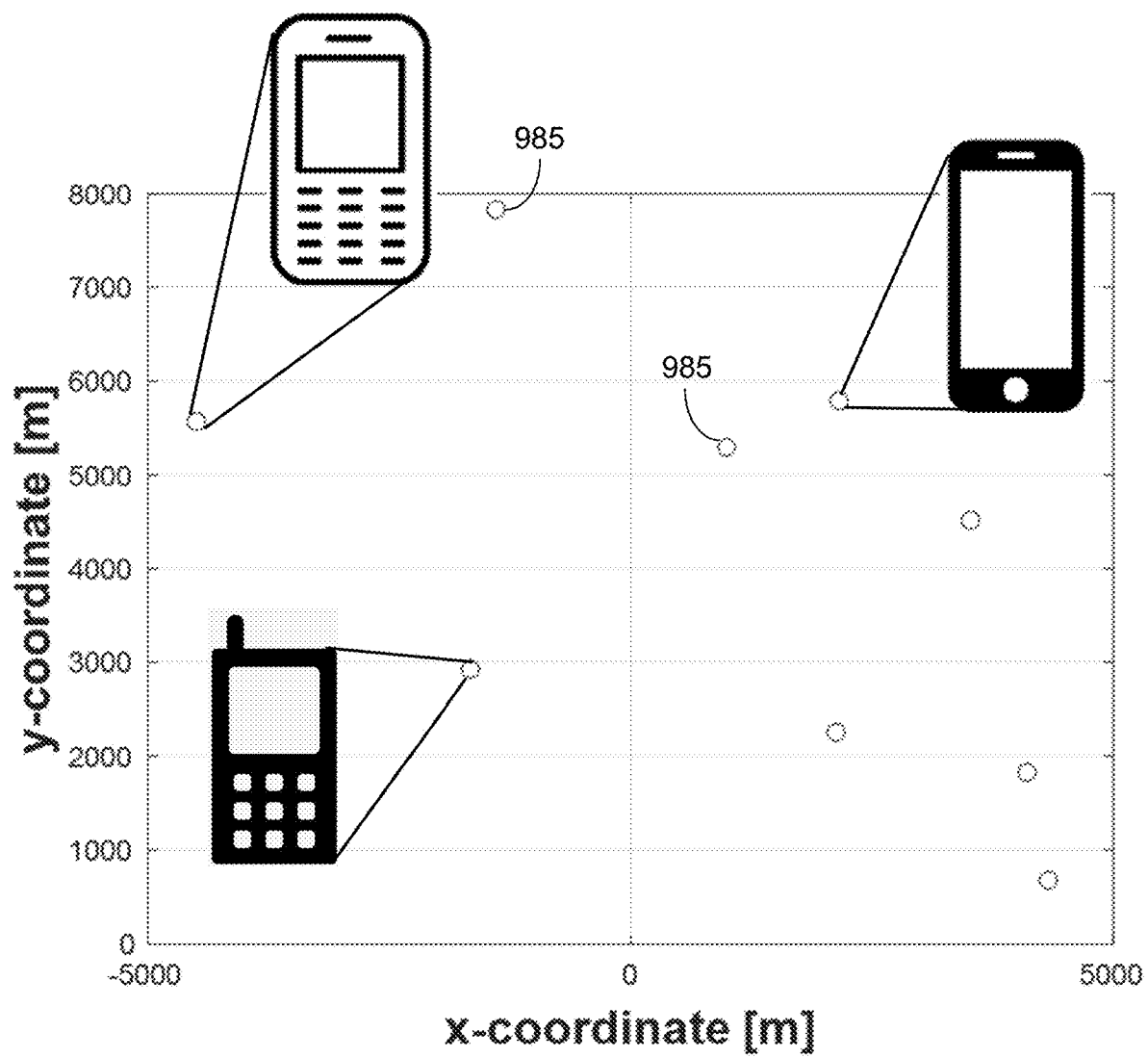
FIG. 9 provides an example plot showing geolocations of detected wireless emitters overlaid with emitter characteristics.

In some examples, the type or class of emitter can be paired with or overlaid on a map or other coordinate system to show the distribution of emitter locations and their types or classes. FIG. 9 provides an example coordinate system showing x- and y-coordinates of a variety of different emitters 985 in a 8 km by 10 km geographic area and including an identifier of the types or classes. This information can be provided as icon information for an emitter or in a configuration where expanded details about a particular emitter can be expanded, such as when the map or coordinate system is displayed on a graphical user interface.

Figure 10:
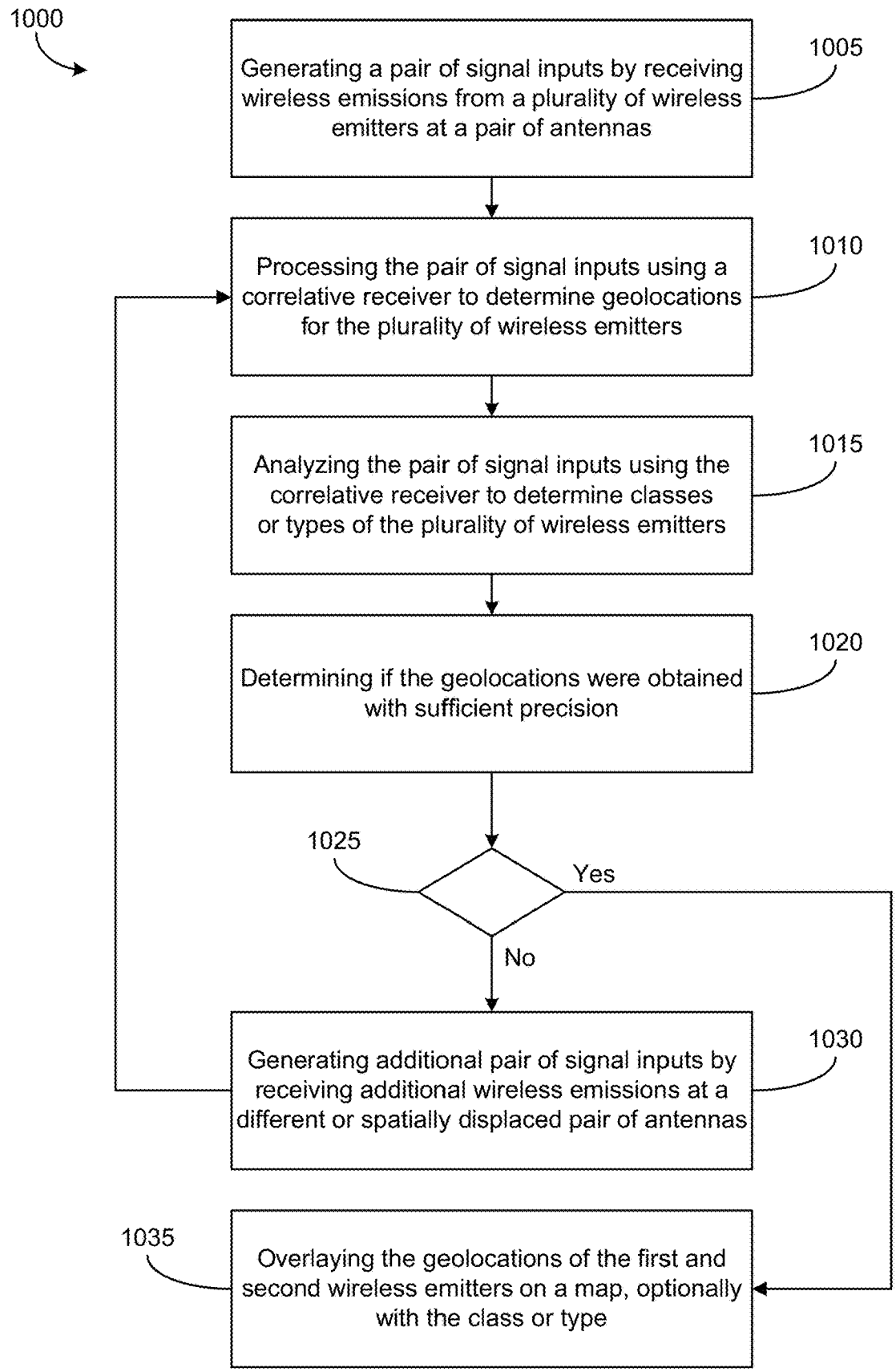
FIG. 10. Provides a simplified flowchart detailing a method of mapping a plurality of wireless emitters in a geographic area, in accordance with some examples of the present disclosure.

FIG. 10 is a simplified flowchart illustrating a method 1000 of mapping a plurality of wireless emitters in a geographic area according to an embodiment of the present invention. At block 1005 a pair of signal inputs is generated by receiving wireless emission from a plurality of wireless emitters at a pair of antennas. The distance between the antennas in the pair can be known, and the wireless signals can be received, possibly at different times, at each antenna. For example, each antenna can generate a time dependent modulated voltage signal, which can be provided as input signals to a correlative receiver.

At block 1010, the pair of signal inputs is processed by the correlative receiver to determine a set of geolocations for the plurality of wireless emitters. As a first step of the process, the time dependent voltage signals can be quantized, such as using an analog to digital converter. Optionally, a Fourier transform of the time dependent signals can be carried out to transform the signals into the frequency space. The signals can then be spectrally correlated using an autocorrelation function, which can allow for features to be extracted, such as a time difference of arrival (TDOA) or an angle of arrival (AoA) to be determined, which can then be used to determine the geolocation of the wireless emitter.

At block 1015, emission signatures can optionally be determined for the pair of signal inputs to determine a set of classes or types of the plurality of wireless emitters. For example, the emission signatures can identify physical parameters (e.g., frequency capabilities, bitrate capabilities, etc.) of the wireless emitters and the class(es) of service (e.g., service provider) the wireless emitters are using. This information may be coupled with the geolocation.

At block 1020, the geolocation information can be evaluated to determine if the geolocations for the plurality of wireless emitters is obtained with sufficient precision. If no, process 1000 can branch at decision point 1025 to block 1030, where additional signal inputs can be generated by receiving additional wireless emissions from the plurality of wireless emitters, such as using one or more different antennas or one or more antennas displaced from those used at block 1005. The process can return to block 1010, where the processing can be repeated for the additional signal inputs to determine updated geolocations for the plurality of wireless emitters.

If the geolocations are determined at block 1020 as being obtained with sufficient precision, process 1000 can branch at decision point 1025 to block 1035, where the geolocations can be overlaid on a map, such as a geographic map, optionally with the class or type information. The process of generating signals by receiving wireless emissions and processing to determine geolocation can be repeated as a function of time to allow tracking geolocations of the plurality of wireless emitters over time. Advantageously, the continued tracking of geolocation, coupled with the corresponding class or type of wireless emitter, can allow an individual wireless emitter to be accurately tracked. The geolocation information, type or class information, mapping information, etc., can be provided as a data stream to one or more recipients.

It should be appreciated that the specific steps illustrated in FIG. 10 provide a particular method of mapping wireless emitters in a geographic area according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of mapping a plurality of wireless emitters in a geographic area, the method comprising:
    obtaining a set of signal inputs corresponding to wireless emissions from the plurality of wireless emitters received at three or more antennas;
    processing the set of signal inputs to determine a plurality of cyclic autocorrelation functions or spectral correlation functions for a plurality of pairs of signal inputs of the set of signal inputs using a correlative receiver;
    analyzing one or more of the plurality of cyclic autocorrelation functions or spectral correlation functions to identify a set of classes or types of the plurality of wireless emitters; and
    determining a set of geolocations of the plurality of wireless emitters using the cyclic autocorrelation functions or the spectral correlation functions.

2. The method of claim 1, further comprising overlaying the set of geolocations on a geographic, network, or symbolic map or geographic, network, or symbolic map data.

3. The method of claim 1, further comprising transmitting the set of geolocations, or a subset thereof, to a remote server.

4. The method of claim 1, wherein processing the set of signal inputs comprises:
    processing multiple pairs of signal inputs from different pairs of the three or more antennas, using the correlative receiver, to determine a set of time delays associated with receiving the wireless emissions at the three or more antennas;
    determining a set of angles of arrival of the wireless emissions at the three or more antennas using the set of time delays; and
    determining the set of geolocations of the plurality of wireless emitters using the set of angles of arrival.

5. The method of claim 1, wherein one or more of the antennas are directly coupled to the correlative receiver or wherein one or more of the antennas are located remotely from the correlative receiver.

6. The method of claim 1, wherein the set of classes or types of the plurality of wireless emitters identifies at least one of a model, a manufacturer, a physical parameter, or a service provider for at least one wireless emitter of the plurality of wireless emitters.

7. The method of claim 1, further comprising overlaying the set of geolocations and the set of classes or types of the plurality of wireless emitters on a geographic, network, or symbolic map or geographic, network, or symbolic map data.

8. The method of claim 1, wherein determining the set of geolocations of the plurality of wireless emitters occurs in real-time or substantially in real-time.

9. The method of claim 1, further comprising:
    repeating one or more times:
        obtaining a new set of signal inputs corresponding to wireless emissions from the plurality of wireless emitters received at the three or more antennas;
        processing the new set of signal inputs to determine a plurality of new cyclic autocorrelation functions or new spectral correlation functions for a plurality of pairs of signal inputs of the new set of signal inputs using the correlative receiver; and determining a new set of geolocations of the plurality of wireless emitters using the new cyclic autocorrelation functions or the new spectral correlation functions; and tracking the set of geolocations and one or more new sets of geolocations of the plurality of wireless emitters over time.

10. The method of claim 1, wherein determining the set of geolocations of the plurality of wireless emitters comprises determining a set of velocities of the plurality of wireless emitters.

11. A system for mapping a plurality of wireless emitters in a geographic area, the system comprising:

a correlative receiver;

three or more antennas configured for data communication with the correlative receiver, wherein the correlative receiver is configured to process a set of signal inputs corresponding to wireless emissions from the plurality of wireless emitters received at the three or more antennas to determine a plurality of cyclic autocorrelation functions or spectral correlation functions for a plurality of pairs of signal inputs of the set of signal inputs; and one or more processors configured to:

analyze one or more of the plurality of cyclic autocorrelation functions or spectral correlation functions to identify a set of classes or types of the plurality of wireless emitters; and determine a set of geolocations of the plurality of wireless emitters using the cyclic autocorrelation functions or the spectral correlation functions.

12. The system of claim 11, wherein the one or more processors are further configured to overlay the set of geolocations on a geographic, network, or symbolic map or geographic, network, or symbolic map data.

13. The system of claim 11, wherein the one or more processors are further configured to transmit the set of geolocations, or a subset thereof, to a remote server.

14. The system of claim 11, wherein, to process the set of signal inputs, the one or more processors are configured to:

process multiple pairs of signal inputs from different pairs of the three or more antennas, using the correlative receiver, to determine a set of time delays associated with receiving the wireless emissions at the three or more antennas;

determine a set of angles of arrival of the wireless emissions at the three or more antennas using the set of time delays; and determine the set of geolocations of the plurality of wireless emitters using the set of angles of arrival.

15. The system of claim 11, wherein one or more of the antennas are directly coupled to the correlative receiver or wherein one or more of the antennas are located remotely from the correlative receiver.

16. The system of claim 11, wherein the set of classes or types of the plurality of wireless emitters identifies at least one of a model, a manufacturer, a physical parameter, or a service provider for at least one wireless emitter of the plurality of wireless emitters.

17. The system of claim 11, wherein the one or more processors are further configured to overlay the set of geolocations and the set of classes or types of the plurality of wireless emitters on a geographic, network, or symbolic map or geographic, network, or symbolic map data.

18. The system of claim 11, wherein the one or more processors are configured to determine the set of geolocations of the plurality of wireless emitters in real-time or substantially in real-time.

19. The system of claim 11, wherein:

the correlative receiver is further configured to, one or more times:

obtain a new set of signal inputs corresponding to wireless emissions from the plurality of wireless emitters received at the three or more antennas; and process the new set of signal inputs to determine a plurality of new cyclic autocorrelation functions or new spectral correlation functions for a plurality of pairs of signal inputs of the new set of signal inputs using the correlative receiver; and the one or more processors are further configured to, one or more times:

determine a new set of geolocations of the plurality of wireless emitters using the new cyclic autocorrelation functions or the new spectral correlation functions; and track the set of geolocations and one or more new sets of geolocations of the plurality of wireless emitters over time.

20. The system of claim 11, wherein, to determine the set of geolocations of the plurality of wireless emitters, the one or more processors are configured to determine a set of velocities of the plurality of wireless emitters.

* * * * *